US012448247B2

(12) United States Patent
Roussel et al.

(10) Patent No.: US 12,448,247 B2
(45) Date of Patent: Oct. 21, 2025

(54) INSPECTION CONTROL SYSTEM FOR AN ELEVATOR SYSTEM AND METHOD FOR SWITCHING AN ELEVATOR SYSTEM BETWEEN A NORMAL MODE AND AN INSPECTION MODE

(71) Applicant: Inventio AG, Hergiswil (CH)

(72) Inventors: Frank Olivier Roussel, Lucerne (CH); Markus Walker, Ziefen (CH)

(73) Assignee: INVENTIO AG, Hergiswil (CH)

( * ) Notice: Subject to any disclaimer, the term of this patent is extended or adjusted under 35 U.S.C. 154(b) by 1374 days.

(21) Appl. No.: 15/733,472

(22) PCT Filed: May 3, 2019

(86) PCT No.: PCT/EP2019/061367
§ 371 (c)(1),
(2) Date: Aug. 4, 2020

(87) PCT Pub. No.: WO2019/219406
PCT Pub. Date: Nov. 21, 2019

(65) Prior Publication Data

US 2021/0101783 A1 Apr. 8, 2021

(30) Foreign Application Priority Data

May 17, 2018 (EP) .................................... 18172906

(51) Int. Cl.
*B66B 5/00* (2006.01)
*B66B 3/00* (2006.01)

(52) U.S. Cl.
CPC ............ *B66B 5/0087* (2013.01); *B66B 3/002* (2013.01); *B66B 5/005* (2013.01)

(58) Field of Classification Search
CPC ........ B66B 5/0087; B66B 3/002; B66B 5/005
See application file for complete search history.

(56) References Cited

U.S. PATENT DOCUMENTS 10,787,341 B2 * 9/2020 Herkel ...................... B66B 9/00
2012/0175193 A1 * 7/2012 Sirigu .................. B66B 5/0087 187/314

(Continued)

FOREIGN PATENT DOCUMENTS

CA 2996459 A1 3/2017
CN 101472830 A 7/2009

(Continued)

OTHER PUBLICATIONS

Schindler Group, New European standard for Lifts EN 81-20 and EN81-50, Sep. 1, 2017, Switzerland.

*Primary Examiner* — Jeffrey Donels
(74) *Attorney, Agent, or Firm* — Patrick B. Horne; Shumaker, Loop & Kendrick, LLP

(57) ABSTRACT

Inspection control system switches elevator system between normal and inspection modes and includes: operating device and at least one emergency stop switch in elevator shaft for deactivating normal and/or inspection mode, for preventing and/or interrupting movement of car. In inspection mode, car is manually controlled by operating device via electric motor, wherein elevator system is switched to normal mode or inspection mode by switch of operating device. Inspection control system also includes: detection device for detecting open and/or closed shaft door, alarm generator, operating switch for activating and/or blocking electric motor, control unit that monitors switching state and actuation sequence of switch and emergency stop switch and compares both with reference switching state and reference sequence with regard to detected state of shaft door. Alarm generator generates alarm signal and operating switch blocks electric motor if switching state deviates from reference switching state or actuation sequence deviates from reference sequence.

15 Claims, 4 Drawing Sheets

(56) References Cited

U.S. PATENT DOCUMENTS

| | | | | |
|---|---|---|---|---|
| 2018/0148297 | A1* | 5/2018 | Tegtmeier | B66B 5/0087 |
| 2018/0244496 | A1* | 8/2018 | Walker | B66B 3/002 |
| 2019/0300336 | A1* | 10/2019 | Witczak | B66B 1/468 |
| 2020/0324999 | A1* | 10/2020 | Stripling | B66B 5/025 |
| 2021/0101781 | A1* | 4/2021 | Roussel | B66B 5/0031 |

FOREIGN PATENT DOCUMENTS

| | | | |
|---|---|---|---|
| CN | 103068710 | A | 4/2013 |
| CN | 101472830 | B | 7/2013 |
| CN | 203820214 | U | 9/2014 |
| CN | 103068710 | B | 7/2015 |
| CN | 107108152 | A | 8/2017 |
| CN | 107108152 | B | 4/2019 |
| EP | 1159218 | B1 | 7/2006 |
| EP | 2033927 | A1 | 3/2009 |
| EP | 2623452 | A1 | 8/2013 |
| EP | 2214998 | B1 | 5/2016 |
| JP | 2000118898 | A | 4/2000 |
| WO | 0051929 | A1 | 9/2000 |
| WO | 2009073001 | A1 | 6/2009 |

* cited by examiner

INSPECTION CONTROL SYSTEM FOR AN ELEVATOR SYSTEM AND METHOD FOR SWITCHING AN ELEVATOR SYSTEM BETWEEN A NORMAL MODE AND AN INSPECTION MODE

FIELD

The present invention relates to an inspection control system for an elevator system and to a method for switching an elevator system between a normal mode and an inspection mode. The invention further relates to an elevator system having such an inspection control system.

BACKGROUND

An elevator system serves to transport people within buildings, wherein an elevator car is moved vertically between different floors in an elevator shaft. In order to be able to guarantee the safety of passengers or service personnel, safety-relevant current states of a number of the components thereof, in particular a so-called safety chain, should be monitored within an elevator system. Many serviceable components and/or components to be serviced are present in the elevator shaft of the elevator system. For the maintenance of such components or for carrying out regular inspection and maintenance work, the elevator system is put into an inspection mode or maintenance mode in which operation of the elevator car is blocked or the elevator car may move at a walking speed by manual control or can be moved only between specific positions within the elevator shaft.

In order to carry out an inspection and maintenance work, a service technician will enter the elevator shaft of the elevator system via a shaft door or a maintenance hatch, wherein a maintenance switch, which is usually located next to the respective shaft door or the maintenance hatch, is to be actuated before entering the elevator shaft. The maintenance switch can, for example, be referred to as an emergency stop switch or emergency brake switch, which, when activated, can interrupt the safety chain, and stop the elevator car and door movements, for example. The maintenance hatch generally designates, for example, a maintenance access and/or a maintenance door. A door switch is typically provided on a car door and on each of a plurality of shaft doors, which switch is closed as long as the respective door is closed. A plurality of door switches is connected in series within a so-called safety chain, so that the security chain as a whole is only closed when each of the door switches is closed. The safety chain is a separate circuit having a discrete number of switches that are configured to indicate the status of the doors and the position of the elevator car. The shaft door or the maintenance hatch are thus coupled to such a safety chain of the elevator system, so that when the shaft door or the maintenance hatch is opened or unlocked, operation of the elevator car can be blocked, for example by interrupting a power supply to drive the elevator car. If the safety chain as a whole is closed and it can thus be assumed that all car and shaft doors are currently closed, an elevator controller can move the elevator car in the elevator shaft in this case.

An example of safety chains for elevator systems and their operation is given, for example, in EP 2214998 A1 (see WO 2009/073001 A1). The safety chain is a series connection that has switches and contacts. The safety chain actuates relays that control the current to the electric motor and the brake. Some parts of the safety chain can be bridged, other parts can be inserted to change the safety monitoring for special operating modes during inspection, maintenance, and rescue operations.

For inspection and maintenance work, according to the EN81-20 standard, there must be an easily accessible controller, e.g. an operating device, on the roof of the elevator car, and in the shaft pit in order to be able to control the elevator car manually during maintenance work. This device must be switched on by a switch, which is normally designated as an inspection switch. The switch must be bistable and protected against unintentional operation. It is often set to operate this switch and an emergency stop switch in succession or simultaneously with both hands in a specific order, so that an inspection trip is not triggered by an unintentional actuation of a single switch. Additionally, two direction buttons (one in the upward direction and one in the downward direction) are generally provided on the controller. An actuation of one of the two direction buttons triggers an inspection trip of the elevator car in the corresponding direction immediately or after actuation of an additional travel button.

After completing maintenance work and after leaving the elevator shaft, the inspection or maintenance mode can be ended by actuating, e.g. deactivating, the controller and the maintenance switch, and by closing or locking the shaft door and, as a result, the elevator system can be returned into regular drive operation in which the elevator controller can move the elevator car by closing the safety chain. In regular drive operation, the elevator car can be moved, for example, despite the presence of personnel in the elevator shaft. In any case, such a dangerous scenario should be avoided.

EP 2033927 A1 relates to a safety device of an elevator system. If an elevator car with an open car door leaves a door zone or reaches a door zone at an impermissible acceleration or speed, a control signal for braking the elevator car is generated.

EP 1159218 A1 (see WO 00/51929 A1) describes an elevator safety system, wherein an electronic safety controller can communicate with a plurality of bus nodes via a safety bus. The electronic safety controller processes the data received from the bus nodes and determines whether there is an unsafe state, and if so, the safety controller sends a stop signal to the drive and brake unit and also sends a status signal to the elevator controller.

EP 2214998 A1 (see WO 2009/073001 A1) discloses a system for recognizing the presence of a person within an elevator shaft. The system comprises a passive infrared detector positioned for detecting infrared radiation from within the elevator shaft and a local processor that compares an infrared profile generated by signals from the passive infrared detector with a reference infrared profile to determine if a person is present in the elevator shaft.

SUMMARY

One aspect of the present invention can be seen in ensuring the occupational safety of an elevator system, in particular in maintenance/inspection or installation work. Among other things, there may be a need for a security measure that can be used to ensure that service personnel can safely enter or leave an elevator shaft.

Such a need as mentioned above can be met by the subject matter the advantageous embodiments defined in the following description.

According to the invention, an inspection control system of an elevator system is provided which has an elevator car and an electric motor, wherein the electric motor is able to drive the elevator car in a shaft of the elevator system for movement under an elevator controller, and wherein the shaft comprises at least one shaft door. The inspection control system comprises an operating device and at least one emergency stop switch in the shaft for deactivating normal mode and/or inspection mode, for preventing and/or for interrupting a movement of the elevator car. In an inspection mode of the elevator system, the elevator car can be controlled manually by means of the operating device via the electric motor, wherein the operator control unit comprises a switch for switching the elevator system between normal mode and inspection mode. The inspection control system further comprises a detection means for detecting an open and/or closed state of the shaft door. As explained above, since the shaft door is coupled to a safety chain of the elevator system, the elevator car is blocked from moving when the shaft door is opened. A state of the safety chain can therefore be monitored by ascertaining an open and/or closed state of the shaft door. Furthermore, the following components are provided in the inspection control system: an alarm generator, an operating switch for activating and/or blocking the electric motor, a control unit which monitors a switching state and an actuation sequence of the switch and the emergency stop switch and which, with regard to a state of the shaft door detected by the detection means, compares them with a predefined reference switching state and a predetermined reference sequence. The control unit controls the alarm generator and the operating switch in such a way that the alarm generator generates an alarm signal and the operating switch blocks the electric motor if the monitored switching state deviates from the reference switching state or the monitored actuation sequence deviates from the reference sequence. The alarm signal generated by the alarm generator can be an acoustic and/or optical signal, for example.

The presence of personnel in the shaft can be reliably ascertained by monitoring the switching states and their switching sequence. It can be ensured that both a service technician staying in the shaft and his colleagues who are outside the shaft are informed of an unsafe state. Additionally, it is also checked whether a safety measure or an operating instruction that describes operation with the switches mentioned above has been observed in practice. If this is not the case, opening the operating switch immediately blocks or interrupts the operating mode of the elevator car. The elevator system can therefore be reliably put into an inspection mode and a normal mode without a dangerous movement of the elevator car being possible in the presence of personnel in the shaft or under certain circumstances with a potential risk.

According to an advantageous embodiment of the preceding invention, the control unit can switch off the alarm generator and activate the electric motor via the operating switch if the monitored switching state matches the reference switching state and the monitored actuation sequence corresponds to the reference sequence or the elevator system returns to the normal mode.

According to a further advantageous embodiment of the preceding invention, the operating device is arranged on the roof of the elevator car or in the shaft pit of the shaft. In the case of two operating devices, they can each be integrated into the control unit and attached to a wall of the shaft. This ensures practical handling and safety for service personnel not only on the car roof, but also in the shaft pit.

According to a second aspect of the invention, a method according to the invention for switching an elevator system, which comprises an elevator car and an electric motor, between a normal mode and an inspection mode is specified, wherein in normal mode of the elevator system the electric motor under an elevator controller drives the elevator car in a shaft for moving, wherein in the method:

- the electric motor is controlled by an operating device, which is located in the shaft, in order to drive the elevator car in an inspection mode of the elevator system, wherein the elevator system is able to be switched into normal mode or into the inspection mode by a switch of the operating device,
- at least one emergency stop switch is provided in the shaft in order to deactivate the normal mode and/or the inspection mode and/or to prevent and/or interrupt a movement of the elevator car,
- an open and/or closed state of the shaft door of the shaft is detected by a detection means,
- a switching state and an actuation sequence of the switch and the emergency stop switch are monitored and compared with a predetermined reference switching state and a predetermined reference sequence with regard to a state of the shaft door detected by the detection means, and
- an alarm signal is generated by an alarm generator and/or the electric motor is blocked if the monitored switching state deviates from the reference switching state or the monitored actuation sequence deviates from the reference sequence.

According to a third aspect of the invention, an elevator system according to the invention is provided with an inspection control system according to the invention or can be carried out by a method according to the invention.

It is pointed out that some of the possible features and advantages of the invention are described herein with reference to different embodiments of the inspection control system on the one hand and a method for switching an elevator system between a normal mode and an inspection mode on the other hand. A person skilled in the art will recognize that the features can be suitably combined, adapted, or replaced in order to arrive at further embodiments of the invention.

An advantageous embodiment of the invention will be described below with reference to the enclosed drawings, wherein neither the drawings nor the description is to be interpreted as limiting the invention. The drawings are only schematic and are not true to scale.

DETAILED DESCRIPTION

Figure 1:
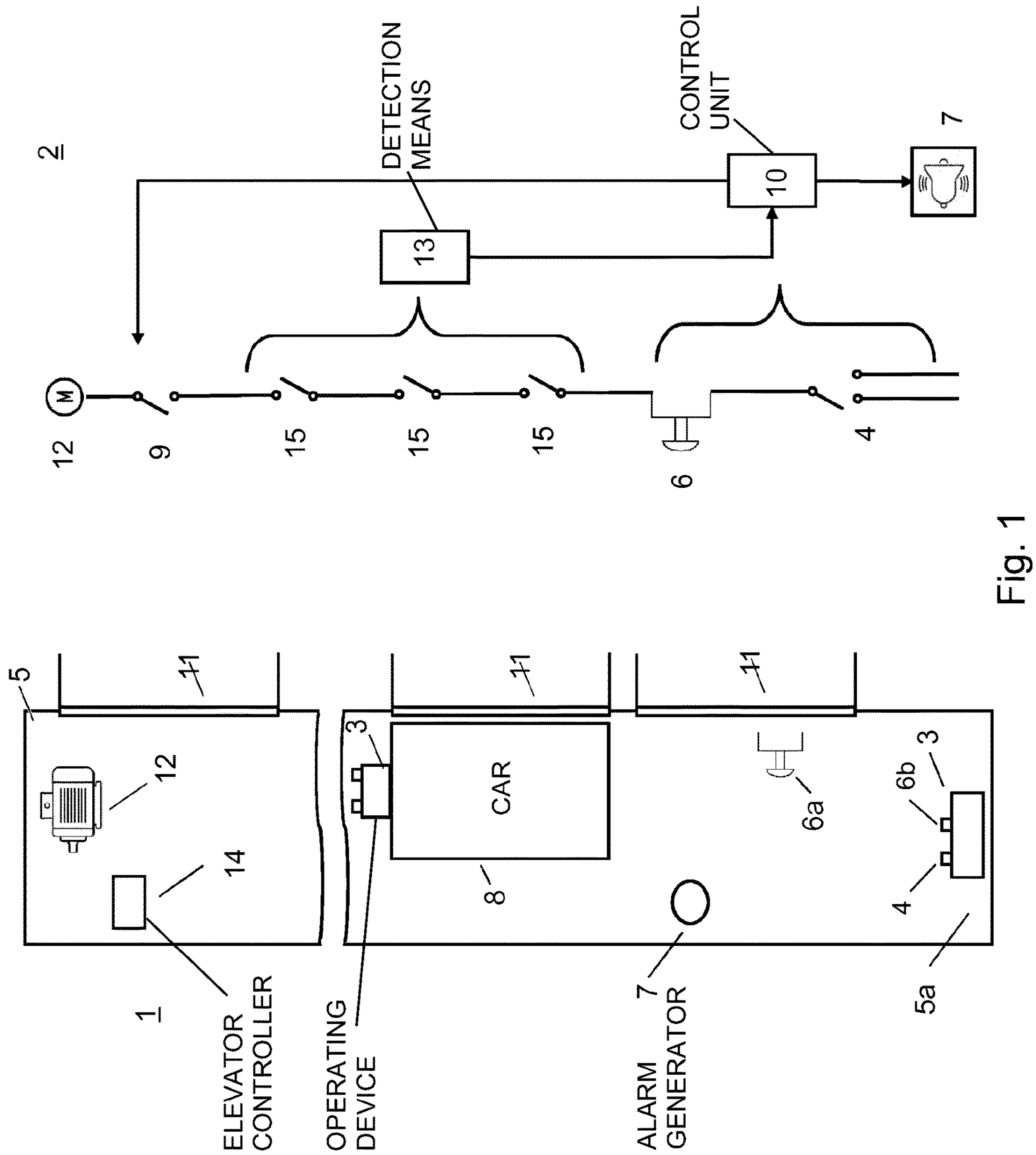
FIG. 1 is a schematic illustration of an inspection control system according to the invention of an elevator system.

FIG. 1 illustrates details of an inspection control system 2 according to the invention of an elevator system 1, wherein a schematic illustration of a circuit for the inspection control system 2 is shown accordingly. An electric motor 12 drives an elevator car 8 in an elevator shaft 5 between different floors for movement. A shaft door 11 is provided on each floor and a car door (not shown) is provided on the elevator car 8. The shaft door 11 can be opened or closed alone or together with the car door.

Figure 2:
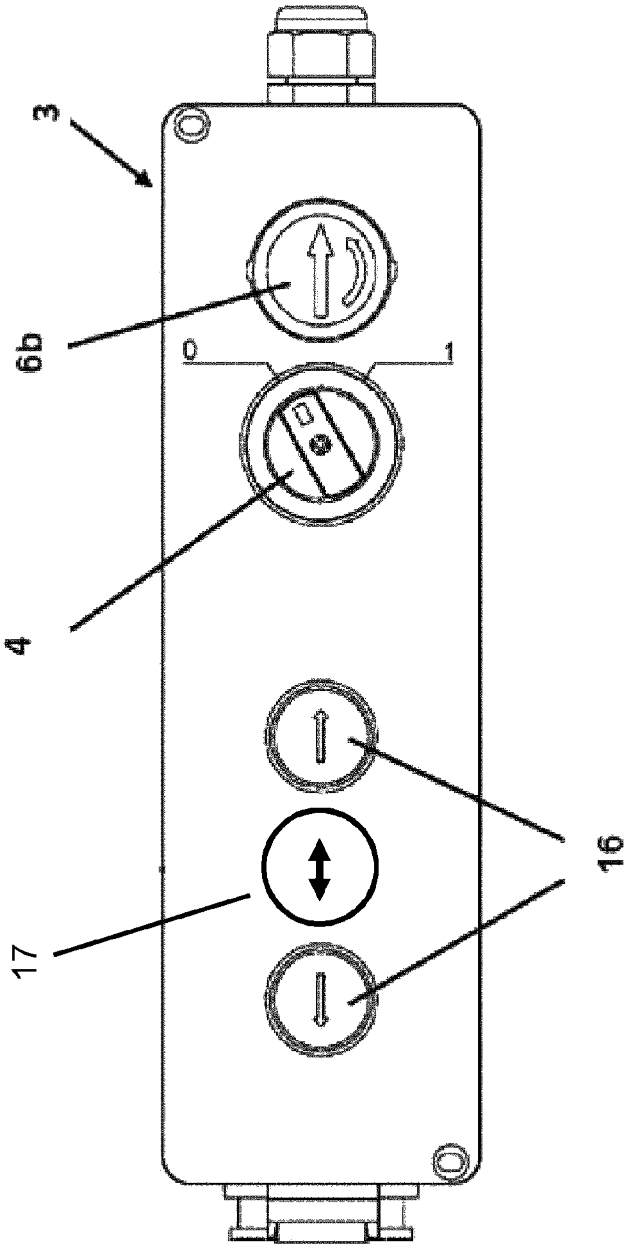
FIG. 2 is a top view of an operating device of an inspection control system according to the invention.

An operating device 3 shown in FIG. 2 is provided in the shaft 5 in order to control the elevator car 8 in the inspection mode. Depending on what elevator standard (e.g. EN 81-20) has to be met, two operating devices 3 can also be arranged on the roof of the elevator car 8 and in the shaft pit 5*a* of the shaft 5, which are at least substantially identical. Each operating device 3 can be used to control the electric motor 12 in the inspection mode of the elevator system 1 in order to move the elevator car 8.

The operating device 3 comprises a mode switch 4 for switching the elevator system 1 into normal mode or into inspection mode. For the elevator car 8 to be able to initiate an inspection trip, the operating mode of the elevator system 1 must first be switched from "normal mode" to "inspection mode" by means of the switch 4, as a result of which the operating device 3 is switched on or activated. The switch 4 can be configured in different ways. For example, the switch 4 can be a simple rotary switch. A combined rotary and pressure switch, a pressure switch, or a toggle switch are also possible, which are connected in series. The elevator car 8 can be controlled in the appropriate direction by actuating two direction buttons 16 each for the upward and downward direction, or additionally an inspection trip of the operating device 3 by actuating a travel button 17.

At least one emergency stop switch 6 is provided in the shaft 5, which is fastened, for example, to a wall of the shaft 5 and close to the shaft door 11 or on the roof of the elevator car 8 in order to deactivate the normal mode and/or the inspection mode, to prevent and/or keep the elevator car 8 from moving. In this exemplary embodiment, the emergency stop switch 6 is configured, for example, with two separate emergency stop switches 6*a*, 6*b*. That is, the operating device 3 is provided with a second emergency stop switch 6*b*, while a first emergency stop switch 6*a* is arranged on the wall of the shaft 5. In addition to the same functions as the first emergency stop switch 6*a,* an immediate remedy can be provided by operating the emergency stop switch 6*b* if the control element 3 fails and a hazard could arise. In order to meet the high safety requirements applicable to an elevator system 1, the switch 4 and the emergency stop switches 6*a*, 6*b* are to be switched in a specific sequence.

The inspection control system 2 is configured such that it is ascertained in each case with an open and/or closed state of the shaft door 11. Door switches 15 are provided on each of the shaft doors 11 and on the car door, using which it can be monitored whether the relevant shaft door or car door is currently correctly closed or at least partially open. In particular, the door switches 15 can be connected in series, so that the part of the safety chain formed thereby is only closed as a whole when all door switches 15 are closed. If a door switch 15 is open, i.e. one of the physical switches is not closed, the movement of the elevator car is considered unsafe and is shut down by the elevator controller 14. In order to ascertain or monitor an open and/or closed state of the shaft door 11, a detection means 13 is provided within the inspection control system 2, whereby a safety-relevant state of the safety chain can also be detected whether the safety chain is closed or open. The detection means 13 is, for example, an electromechanical switch. As an alternative to this, the detection means 13 can be a current meter or a voltage meter, which can measure a current through the safety chain or a voltage on that door switch 15.

A control unit 10 is provided for monitoring a switching state and an actuation sequence of the switch 4 and the emergency stop switch 6 or the emergency stop switches 6*a* and 6*b*. With regard to a state of the shaft door 11, the control unit 10 compares the actuations or the switching states of the switch 4 and the emergency stop switches 6*a* and/or 6*b* with a predefined reference switching state and a predefined reference sequence. Normally, maintenance/inspection work on the roof of an elevator car 8 requires only one emergency stop switch 6*b* and work in a shaft pit 5*a* both emergency stop switches 6*a* and 6*b*. Such a reference value can be pre-stored in the control unit 10, for example. The control unit 10 further controls an alarm generator 7 and an operating switch 9 such that the alarm generator 7 generates, for example, an acoustic alarm signal and the operating switch 9 is opened in order to interrupt the electrical connection to the electric motor 12 and consequently to be able to prevent the elevator car 8 from moving if the monitored switching state or switching sequence deviates from the reference value.

Figure 3A:
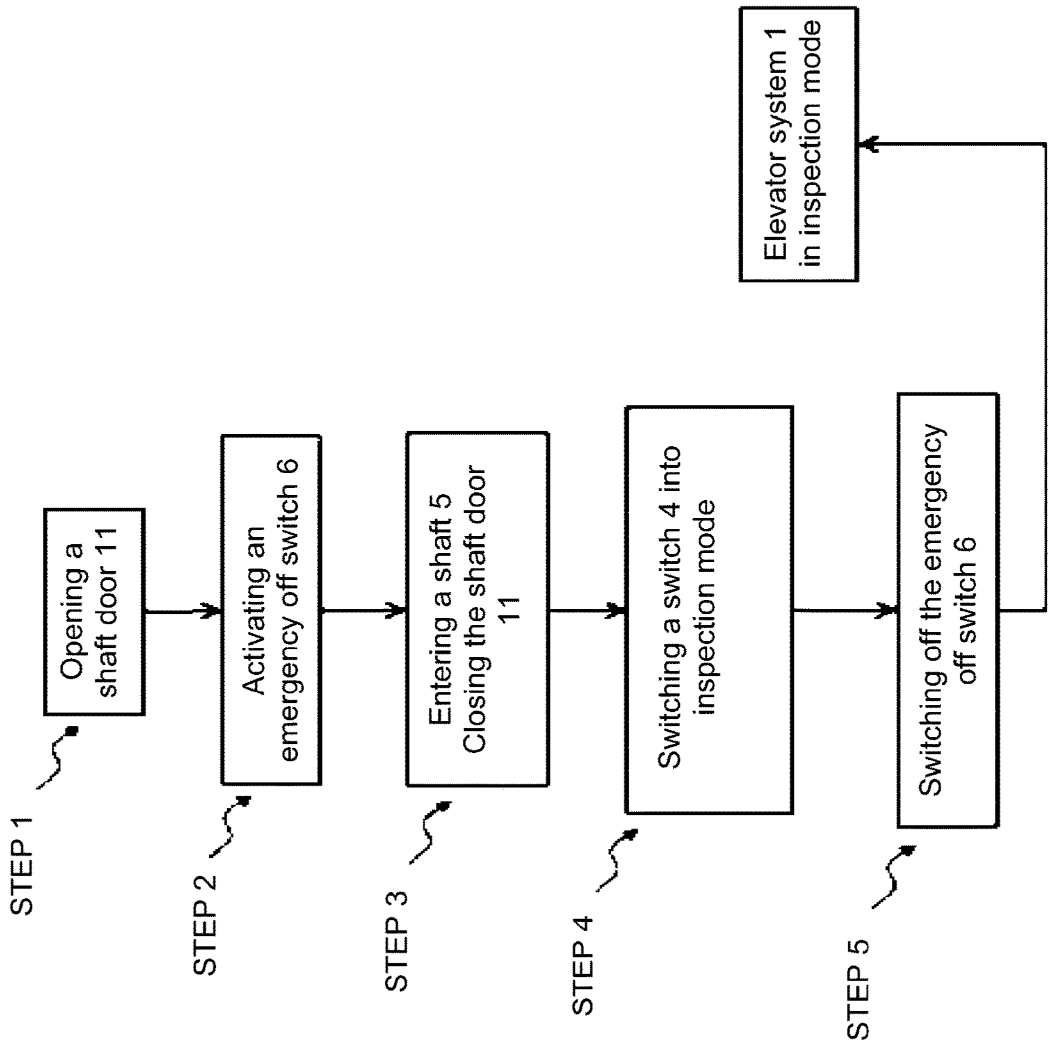
FIGS. 3*a* and 3*b* are a flowchart for the illustration of a method according to the invention for switching an elevator system between a normal mode and an inspection mode.
Figure 3B:
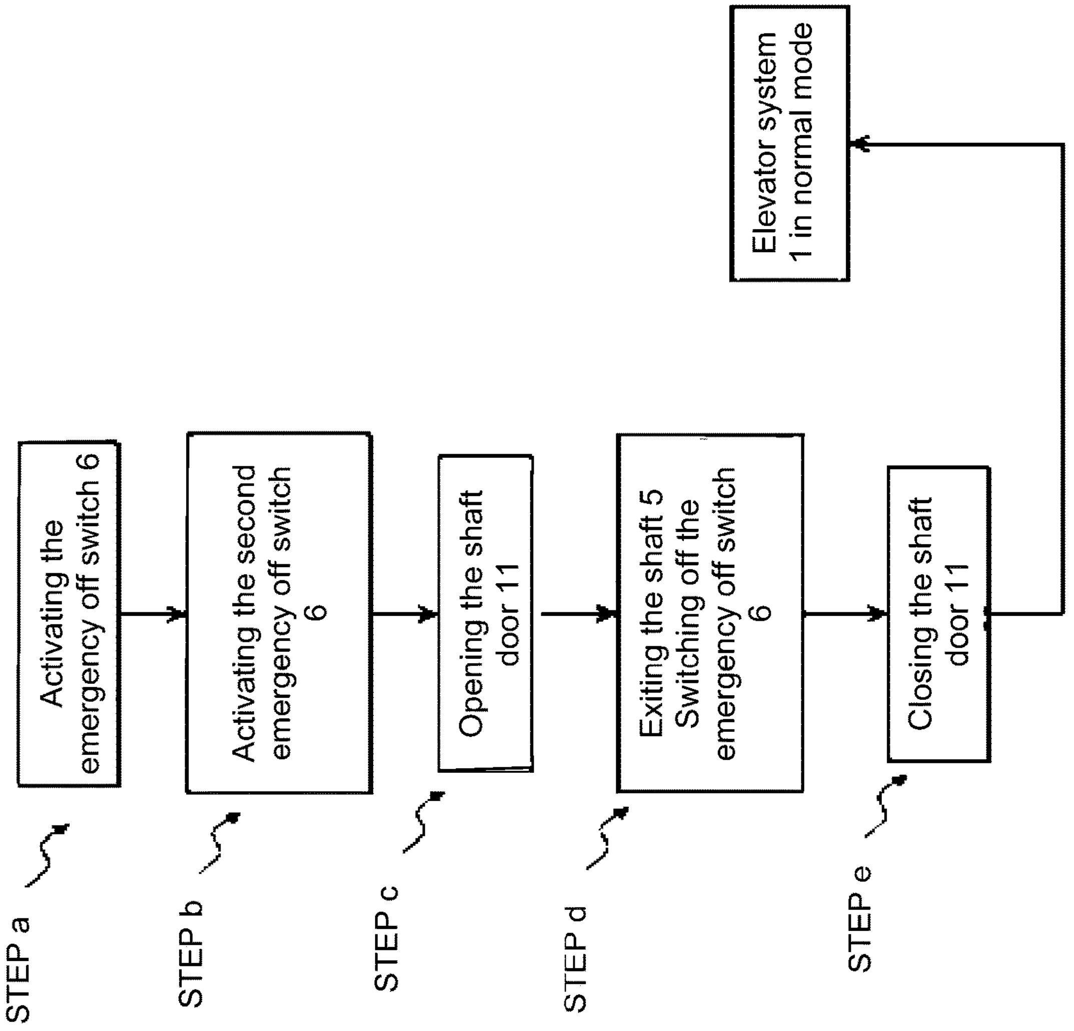

FIGS. 3*a* and 3*b* show a method according to the invention for moving an elevator system between a normal mode and an inspection mode by means of a flow chart.

It is assumed that an inspection work for an elevator system 1, which is shown in FIG. 1, is to be carried out in a shaft 5, wherein two emergency stop switches 6*a* and 6*b* are each located on a wall next to a shaft door 11 and in the shaft pit 5*a*. Therefore, the following steps are to be performed as shown in FIG. 3*a:*

- Step 1: Opening a shaft door 11 on the ground floor, such that the safety chain of the elevator system 1 is interrupted;
- Step 2: Depending on whether an inspection work is to be carried out in a shaft pit 5*a* or on the roof of an elevator car 8, activating or releasing an emergency stop switch 6 (6*a* or 6*b*) which is fastened close to the shaft door 11 on a wall of the shaft 5 or on an operating device 3 on the roof of the elevator car 8;
- Step 3: Entering the shaft pit 5*a* and closing the shaft door 11. Although the safety chain is closed, a possible movement of the elevator car 8 due to the activation of the emergency stop switch 6 is prevented;
- Step 4: Switching the switch 4 of the operating device 3 into a switching position which corresponds to an inspection operating mode, and at the same time switching off the emergency stop switch 6 (6*a* and 6*b*) in order to activate the elevator system 1 into the inspection mode.

Then the elevator system 1 or the elevator car 8 can be controlled by the operating device 3 in the inspection mode.

After the inspection work, if the service technician wants to get out of the shaft 5, he should proceed with the following steps as in FIG. 3*b*. In order to illustrate more clearly compared to the steps for inspection work listed above, the steps for completing the inspection work are designated here with letters.

- Step a: Turning on the emergency stop switch 6*a* or 6*b* to block the elevator car 8 from moving;
- Step b: Switching the switch 4 to a different switching position, which corresponds to a normal operating mode;
- Step c: Opening a shaft door 11 to interrupt the safety chain;
- Step d: Emerging from the shaft pit 5*a* and switching off the emergency stop switch 6*a* and/or 6*b;*
- Step e: Closing the shaft door 11 to close the safety chain.

Finally, a representation of the states of the switches and their switching sequence is given in the tables below. For a simple overview, the states are represented by binary values "1" and "0", namely shaft door closed with "1", shaft door open with "0", normal mode with "0", inspection mode with "1", emergency stop switch switched on/activated with "1", emergency stop switch switched off/deactivated with "0", safety chain closed with "1" and safety chain interrupted with "0".

In Table 1 are the states of the switches, the shaft door, and the safety chain for preparation of an inspection work in case two emergency stop switches are used. And Table 2 relates to the completion of an inspection work, namely for commissioning the elevator system 1 in normal mode.

TABLE 1

States of the switches for starting inspection work

| Step | Shaft door | Emergency stop switch | Switch | Safety chain |
|---|---|---|---|---|
| 1 | 0 | 0 | 0 | 0 |
| 2 | 0 | 1 | 0 | 0 |
| 3 | 1 | 1 | 0 | 0 |
| 4 | 1 | 1 | 1 | 0 |
| 5 | 1 | 0 | 1 | 1 |

TABLE 2

States of the switches for completion of inspection work

| Step | Shaft door | Emergency stop switch | Switch | Safety chain |
|---|---|---|---|---|
| a | 1 | 1 | 1 | 0 |
| b | 1 | 1 | 0 | 0 |
| c | 0 | 1 | 0 | 0 |
| d | 0 | 0 | 0 | 0 |
| e | 1 | 0 | 0 | 1 |

It can be clearly seen that not only the respective states, but also their sequence must fulfill a specific rule if all steps 1 to 5 or a to e have been carried out correctly. The control unit 10 can check such states or their changing sequence accordingly, for example by means of a digital data processing method with predetermined reference switching states and reference sequences. Depending on which switch is not switched correctly, a fault can be determined by a service technician either for a specific defective switch or for an operation that is contrary to safety rules or in violation of standards.

In summary, embodiments of the inspection control system or method presented here allow an early detection of a safety hazard in an elevator shaft, for example if a switch cannot be switched correctly, a shaft door or a safety chain is not in a correct state, or a service technician did not perform a task according to standards. Even in the case of the slightest damage or a violation of a criterion of a standard or rule that is highly relevant for safety, the inspection control system will determine this error and generate an alarm signal.

Finally, it should be noted that terms such as "having," "comprising," etc. do not preclude other elements or steps and terms such as "a" or "an" do not preclude a plurality. Furthermore, it should be noted that features or steps that have been described with reference to one of the above embodiments can also be used in combination with other features or steps of other embodiments described above.

It is pointed out that possible features and advantages of embodiments of the invention are described here partly with reference to a method according to the invention and partly with reference to a device according to the invention. A person skilled in the art will recognize that the individual features can be combined, modified, or exchanged in a suitable manner and that features described in particular for the method can be transferred analogously to the device and vice versa in order to arrive at further embodiments of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 elevator system
2 inspection control system
3 operating device
4 mode switch
5 shaft
5*a* shaft pit
6emergency stop switch
6*a* the first emergency stop switch
6*b* the second emergency stop switch
7 alarm generator
8 elevator car
9 operating switch
10 control unit
11 shaft door
12 electric motor
13 detection means
14 elevator controller
15 door switch
16 direction button
17 travel button

The invention claimed is:

1. An inspection control system of an elevator system, the elevator system including an elevator car and an electric motor, wherein the electric motor moves the elevator car in a shaft in response to an elevator controller in a normal mode of the elevator system, and wherein the shaft has a shaft door, the inspection control system comprising:

an operating device in the shaft for controlling the electric motor in an inspection mode of the elevator system for moving the elevator car, wherein the operating device includes a mode switch for switching the elevator system between the normal mode and the inspection mode;

an emergency stop switch in the shaft for deactivating at least one of the normal mode and inspection mode thereby preventing or interrupting a movement of the elevator car;

a detection means for detecting at least one of an open state and a closed state of the shaft door;

an alarm generator;

an operating switch for blocking the electric motor;

a control unit monitoring a switching state and an actuation sequence of the mode switch and the emergency stop switch and which, with regard to a state of the shaft door detected by the detection means, compares the switching state and the actuation sequence with a predetermined reference switching state and a predetermined reference sequence respectively; and wherein the control unit controls the alarm generator and the operating switch such that at least one of the alarm generator generates an alarm signal and the operating switch blocks the electric motor when the monitored switching state deviates from the reference switching state or the monitored actuation sequence deviates from the reference sequence.

2. The inspection control system according to claim 1 wherein the control unit switches off the alarm generator and activates the electric motor via the operating switch when the monitored switching state matches the reference switching state and the monitored actuation sequence corresponds to the reference sequence or when the elevator system returns to the normal mode.

3. The inspection control system according to claim 1 wherein the operating device is arranged on a roof of the elevator car or in a shaft pit of the shaft.

4. The inspection control system according to claim 3 wherein the operating device is arranged on the roof of the elevator car and including another of the operating device is arranged in the shaft pit of the shaft.

5. The inspection control system according to claim 1 wherein the emergency stop switch is provided at the operating device or arranged on a wall of the shaft.

6. The inspection control system according to claim 5 wherein the emergency stop switch is provided at the operating device and including another of the emergency stop switch arranged on the wall of the shaft.

7. The inspection control system according to claim 1 wherein the alarm signal generated by the alarm generator is at least one of an acoustic signal and an optical signal.

8. An elevator system comprising: an elevator car; an electric motor, wherein the electric motor moves the elevator car in a shaft in response to an elevator controller in a normal mode of the elevator system, and wherein the shaft has a shaft door; and an inspection control system according to claim 1.

9. A method for switching an elevator system between a normal mode and an inspection mode, the elevator system including an elevator car and an electric motor, wherein the electric motor in response to an elevator controller during the normal mode moves the elevator car in a shaft, the method comprising the steps of:

controlling the electric motor with an operating device located in the shaft to move the elevator car in the inspection mode of the elevator system after switching a mode switch of the control unit between the normal mode and the inspection mode;

providing at least one emergency stop switch in the shaft to deactivate the normal mode and the inspection mode and to prevent or interrupt a movement of the elevator car;

detecting at least one of an open state and a closed state of a shaft door of the shaft with a detection means;

monitoring a switching state and an actuation sequence of the mode switch and the at least one emergency stop switch and comparing the monitored switching state and actuation sequence with a predetermined reference switching state and a predetermined reference sequence respectively with regard to a state of the shaft door detected by the detection means; and at least one of generating an alarm signal from an alarm generator and blocking the electric motor when the monitored switching state deviates from the reference switching state or the monitored actuation sequence deviates from the reference sequence.

10. The method according to claim 9 including switching off the alarm generator and activating the electric motor when the monitored switching state matches the reference switching state and the monitored actuation sequence corresponds to the reference sequence or when the elevator system is in the normal mode.

11. The method according to claim 9 wherein the operating device is arranged on a roof of the elevator car or in a shaft pit of the shaft.

12. The method according to claim 11 wherein the operating device is arranged on a roof of the elevator car and including another of the operating device arranged in the shaft pit of the shaft.

13. The method according to claim 9 wherein the at least one emergency stop switch is provided at the operating device or arranged on a wall of the shaft.

14. The method according to claim 13 wherein the at least one emergency stop switch is provided at the operating device and including another of the emergency stop switch arranged on the wall of the shaft.

15. An elevator system comprising: an elevator car: an electric motor, wherein the electric motor moves the elevator car in a shaft in response to an elevator controller in a normal mode of the elevator system, and wherein the shaft has a shaft door; and an inspection control system adapted to perform the method according to claim 9.

* * * * *